US008607194B2

(12) United States Patent
Gandolph et al.

(10) Patent No.: US 8,607,194 B2
(45) Date of Patent: *Dec. 10, 2013

(54) METHOD AND APPARATUS FOR EXECUTING SOFTWARE APPLICATIONS

(75) Inventors: Dirk Gandolph, Ronnenberg (DE); Carsten Herpel, Wennigsen (DE); Jobst Hoerentrup, Wennigsen (DE); Uwe Janssen, Seelze (DE); Ralf Ostermann, Hannover (DE); Hartmut Peters, Barsinghausen (DE); Andrej Schewzow, Hannover (DE); Marco Winter, Hannover (DE)

(73) Assignee: Thomson Licensing, Issy les Moulineaux (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/448,254

(22) Filed: Apr. 16, 2012

(65) Prior Publication Data

US 2012/0204147 A1    Aug. 9, 2012

Related U.S. Application Data

(63) Continuation of application No. 11/884,698, filed on Aug. 20, 2007, now Pat. No. 8,418,133.

(30) Foreign Application Priority Data

Feb. 23, 2005  (EP) ..................... 05090040

(51) Int. Cl.
*G06F 9/44* (2006.01)
(52) U.S. Cl.
USPC ............ 717/120; 717/115; 717/121; 717/168
(58) Field of Classification Search
None
See application file for complete search history.

(56) References Cited

U.S. PATENT DOCUMENTS

| 5,597,307 | A | 1/1997 | Redford et al. |
| 5,644,782 | A | 7/1997 | Yeates et al. |
| 5,795,156 | A | 8/1998 | Redford et al. |
| 5,946,278 | A | 8/1999 | Tower |
| 5,978,324 | A | 11/1999 | Inatani et al. |
| 6,292,443 | B1 * | 9/2001 | Awazu et al. ............. 369/44.26 |
| 6,339,572 | B1 | 1/2002 | Hamada et al. |
| 6,366,732 | B1 | 4/2002 | Murase et al. |
| 6,580,870 | B1 | 6/2003 | Kanazawa et al. |

(Continued)

FOREIGN PATENT DOCUMENTS

| EP | 0757350 A2 | 2/1997 |
| EP | 1152335 | 11/2001 |

(Continued)

*Primary Examiner* — Thuy Dao
(74) *Attorney, Agent, or Firm* — Robert D. Shedd; Jeffrey M. Navon

(57) ABSTRACT

Consumer electronic devices, such as e.g. high-definition movie players for removable storage media such as optical discs, may provide possibilities for advanced interactivity for the user, implemented as software applications. A question arising generally with such software applications is what the life cycle of such an application is, and who may control it. The invention provides a method for executing software applications within a playback device for audio-video data, wherein data from a first removable storage medium are read for a software application to be executed within said playback device, and the data comprise an indication defining a termination condition for the application. Based on said termination code and depending on how the medium holding the application is ejected, the application is terminated or may survive.

2 Claims, 7 Drawing Sheets

(56) References Cited

U.S. PATENT DOCUMENTS

| | | | |
|---|---|---|---|
| 6,836,623 | B2 | 12/2004 | Imai |
| 7,565,062 | B2 | 7/2009 | Iwamoto et al. |
| 7,600,224 | B2 * | 10/2009 | Obayashi et al. ............. 717/168 |
| 7,616,864 | B2 | 11/2009 | Tanaka et al. |
| 7,627,233 | B2 | 12/2009 | Iwamoto et al. |
| 7,640,228 | B2 | 12/2009 | Horentrup et al. |
| 7,668,844 | B2 | 2/2010 | Kim et al. |
| 7,941,786 | B2 * | 5/2011 | Scott et al. .................... 717/121 |
| 7,949,998 | B2 * | 5/2011 | Bleisch et al. ................. 717/120 |
| 7,996,448 | B2 | 8/2011 | Kim et al. |
| 8,032,007 | B2 | 10/2011 | Ikeda |
| 8,042,096 | B2 | 10/2011 | Hoerentrup et al. |
| 8,196,103 | B2 | 6/2012 | Glass et al. |
| 8,418,133 | B2 * | 4/2013 | Gandolph et al. ............ 717/115 |
| 2001/0018737 | A1 | 8/2001 | Redford et al. |
| 2002/0194337 | A1 | 12/2002 | Knight et al. |
| 2003/0128648 | A1 | 7/2003 | Wagner et al. |
| 2003/0223766 | A1 | 12/2003 | Imai |
| 2004/0018007 | A1 | 1/2004 | Akita |
| 2004/0025012 | A1 | 2/2004 | Burks |
| 2004/0199898 | A1 | 10/2004 | Glass et al. |
| 2005/0078944 | A1 | 4/2005 | Risan et al. |
| 2005/0117883 | A1 | 6/2005 | Kim et al. |
| 2005/0135784 | A1 | 6/2005 | Seo et al. |
| 2006/0140091 | A1 | 6/2006 | Iwamoto et al. |
| 2006/0171670 | A1 | 8/2006 | Doi |
| 2006/0245742 | A1 | 11/2006 | Ashley et al. |
| 2008/0134143 | A1 * | 6/2008 | Hoerentrup et al. .......... 717/120 |
| 2008/0292270 | A1 | 11/2008 | Ikeda |
| 2012/0204145 | A1 * | 8/2012 | Gandolph et al. ............ 717/120 |

FOREIGN PATENT DOCUMENTS

| | | |
|---|---|---|
| EP | 1764799 | 3/2007 |
| JP | 2001312410 | 11/2001 |
| WO | 01/33847 A | 5/2002 |
| WO | 02/086746 A1 | 10/2002 |
| WO | 2004/053719 A1 | 6/2004 |
| WO | 2004102562 A1 | 11/2004 |
| WO | WO2006082892 | 8/2006 |

* cited by examiner

METHOD AND APPARATUS FOR EXECUTING SOFTWARE APPLICATIONS

RELATED APPLICATIONS

This application is a continuation of U.S. Ser. No. 11/884,698, entitled "Method and Apparatus for Executing Software Applications" filed Aug. 20, 2007 and which issues as U.S. Pat. No. 8,418,133, on Apr. 9, 2013.

FIELD OF THE INVENTION

This invention relates to a method for executing or terminating software applications.

BACKGROUND

Latest developments in consumer electronic devices, such as e.g. high-definition (HD) movie players for removable storage media, provide possibilities for advanced interactivity for the user. Techniques for interactive software applications are based upon script execution, e.g. ECMAscript, or on execution of code, e.g. JAVA, that is either interpreted or pre-compiled for running on a virtual machine (VM) located in the device. Such an application could e.g. be a news ticker showing text at the bottom of the picture in an overlay while e.g. a HD movie is running and depicted on the screen. While the HD movie is read from the removable storage medium, the ticker application executable can also be read from the same medium or from the local storage of the player. The application data can be stored e.g. in an archive file, e.g. a JAR file for Java applications. The data used by the ticker-application however, i.e. the message to be displayed, can be read e.g. from a server via the Internet.

SUMMARY OF THE INVENTION

A question arising generally with software applications is what the life cycle of such an application is, and who may control it. Especially, if an application was read from a first removable storage medium and started while the medium was inserted in the player, and then the storage medium was ejected and left the player, the usual consequence for the running application (e.g. the news ticker) is either to continue running independent from any storage medium being inserted in the player, or to terminate immediately. In the first case the application process will usually run until the user terminates it manually, e.g. by switching off the device. This is uncomfortable for the user, particularly in the case of consumer electronic devices. Further it is desirable to have software applications that survive (i.e. continue execution) also if the storage medium from which they were loaded is removed or otherwise not accessible.

The current invention provides a method for controlling whether a running software application being loaded from a removable storage medium, and running on a player for this medium, should continue or terminate when this removable storage medium is ejected. In principle, the software application may also run on a different connected device if the connection between the player and the other device includes control lines for terminating the application. Further, the method according to the invention is suitable for controlling whether execution of a software application may continue after another removable storage medium is inserted in the player. According to the present invention, the decision whether a running application is terminated or not upon medium ejection may depend on why the medium was ejected, and under which conditions the application is allowed to stay alive, i.e. continue running.

Particularly, and assuming that a storage medium may contain a plurality of titles from which the user may select or which may be appended or stringed automatically, these conditions may include terminating an application always upon title change, terminating an application only upon title change initiated by a user, terminating an application upon title change when a previous title requested a particular follower title and the next title is not the requested title, terminating an application unconditionally upon medium ejection, terminating an application upon medium ejection only if the medium ejection is caused by a user e.g. pressing a (hardware or software, i.e. displayed on screen) eject button, terminating an application upon medium ejection and insertion of another medium, and terminating an application upon medium ejection and insertion of another medium, wherein the application requested a particular follower medium and the actually inserted medium is not the requested follower medium. In other words, software applications according to the invention loaded from a removable storage medium may have a defined lifetime, may request specific other removable media, and may continue running when the requested removable media are inserted or be terminated when other, unrequested removable media are inserted.

Further, in one embodiment an application may specify a plurality of removable media that it accepts, and continues execution when any of the specified media is inserted while terminating when another medium is inserted.

According to the invention, a method for executing software applications within a playback device for audio-video data read from a removable storage medium, wherein the playback device comprises a hardware button and/or a software button for ejecting the removable storage medium, comprises the steps of reading from a first removable storage medium data for a software application to be executed (preferably within said playback device), the data comprising script code or executable code defining said application, and further comprising an indication defining a termination condition for the application, storing said indication (preferably within the playback device), starting execution of said application (preferably within the playback device), receiving a command for ejection of the first storage medium, detecting whether the received command for ejection was initiated by the software application or by the user using said hardware and/or software button for ejection, deciding, depending on said stored indication and on the result of said detecting, whether to terminate or to continue the software application, and based on the decision, terminating or continuing the software application. If the application runs on another device connected to the playback device, a further step performs sending a termination signal to the other device in order to terminate the running process.

In one embodiment of the invention, the method for executing software applications is further specified in that the step of deciding comprises deciding to continue execution of the software application, if said indication indicates that execution of the software application may continue upon ejection of said first storage medium, or if the detecting yields that the command for ejection was initiated by the software application and said indication indicates that execution of the software application may continue upon ejection of said first storage medium if the ejection was initiated by the software application; or deciding to terminate said software application, if said indication indicates termination of the software application upon ejection of said first storage medium, or if said detection yields that the command for ejection was initiated by the user.

In one embodiment, the method for executing software applications further comprises the steps of receiving from said software application a first identifier, storing the first identifier, detecting before the step of deciding insertion of another removable storage medium, reading a second identifier from the second removable storage medium, comparing the stored first identifier and the second identifier, and deciding, depending on said stored indication and on the result of said detecting and on the result of said comparison, whether to terminate or to continue the software application.

The identifiers that are read from the medium can e.g. be title identifiers or medium identifiers, which are equal for several or all copies of a medium. Thus, the identifiers relate rather to contents than to physical media, i.e. several or all copies of e.g. a particular edition of a particular movie have the same identifier. For read-only media, e.g. the content provider may assign this identifier.

According to another aspect of the invention, a method for executing or terminating software applications within a playback device for removable storage media comprises the steps of reading a first identifier from a first removable storage medium, reading from the first medium data for a software application, starting execution of said application e.g. on a virtual machine (VM), then detecting a request for a particular removable storage medium, determining whether the request comes from the user or from the application, and if the request comes from the application then also receiving an identifier identifying a requested removable storage medium, further storing the received identifier identifying the requested removable storage medium, ejecting the first removable storage medium, wherein execution of said software application continues, detecting insertion of a second removable storage medium, reading an identifier from the second removable storage medium, comparing the stored identifier with the read identifier of the second removable storage medium, and continuing said software application if the compared identifiers match while otherwise terminating said software application.

In a preferred embodiment, the running software application contains an identifier indicating whether the application is qualified for survival, i.e. if it must be terminated immediately upon ejection of the removable storage medium it was read from. Such applications are called herein "bound", because they are bound to a particular removable storage medium. Other applications are called "unbound" herein, because they are not bound to a particular medium and may continue to be executed upon certain conditions after the storage medium they were read from is ejected. This identifier relating to an application is e.g. stored within a list of running processes or running VM applications, and checked either while said removable storage medium is ejected or later while a new removable storage medium is inserted. In the latter case, the identifier of the new medium can be checked before terminating bound applications, so that it is possible to continue even bound applications if the same medium is inserted again.

The solution given by this invention satisfies equally the content provider and the user of the player. On the one hand it provides advantages with respect to security that are relevant for the content providers being afraid about misuse of their multimedia content, and on the other hand it prevents the user from being annoyed by applications that continue running when the user decides to eject the medium.

An apparatus according to the invention for playback of multimedia data read from a removable storage medium, comprises a processing unit for executing script code or executable code, e.g. Java or ECMAscript code, a hardware and/or a software button for ejection of the removable storage medium, means for reading from a first removable storage medium data for a software application to be executed within said processing unit, the data comprising script code or executable code defining said application, and further comprising an indication defining a termination condition for the application, means for storing said indication, e.g. a register, means for receiving a command for ejection of the first storage medium, like the hardware and/or software button mentioned above, means for detecting whether the command for ejection was initiated by the software application or by the user using said hardware and/or software button for ejection, means for deciding, depending on said stored indication and on the result of said detecting, whether to terminate or to continue the software application, wherein the means for deciding outputs a decision signal, and means for terminating or continuing the software application, based on said decision signal.

According to another aspect of the invention, an apparatus for playback of multimedia data read from a removable storage medium, comprises a processing unit for running a virtual machine (VM), means for reading from a first removable storage medium an identifier, means for reading from the first removable storage medium data for a first software application being executable on the VM, means for detecting a request for changing the removable storage medium, means for determining whether the change request comes from the user or from the application, means for receiving an indication of a requested identifier if the request comes from the application, means for storing the requested identifier, means for ejecting the first medium, means for detecting insertion of a second medium, means for reading a second identifier from the second medium, means for comparing the stored identifier with the second identifier, and means for terminating said software application if the compared identifiers do not match, and for otherwise continuing said software application.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which shows in FIG. 1 the life cycles of different software applications.

DETAILED DESCRIPTION OF THE INVENTION

Figure 1:
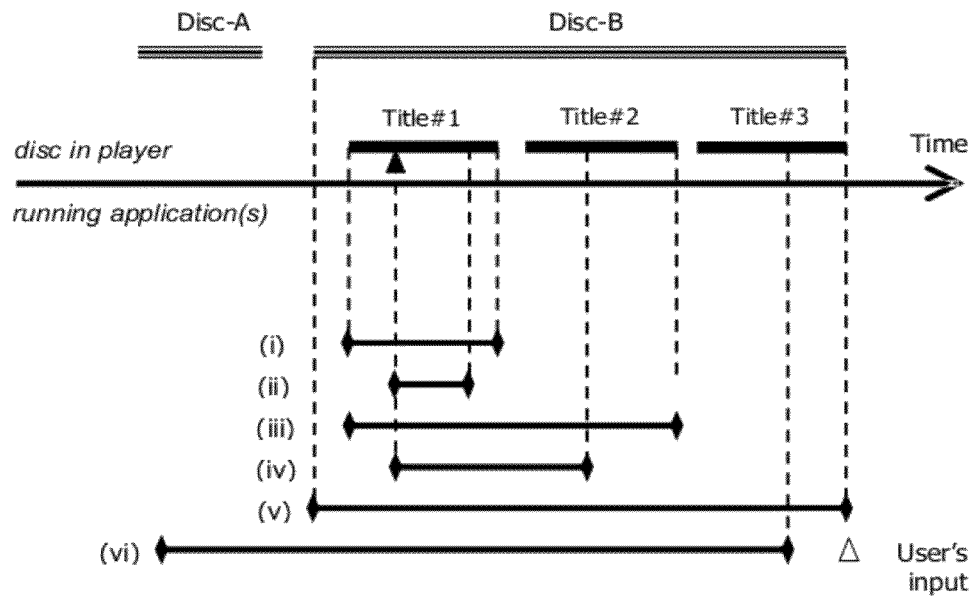

Though the following examples are based on optical disc players, the invention described herein is also applicable to other high-density storage media and respective players. Consumer electronics devices, like HD movie players, often provide the option to run software applications, particularly interactive applications, like e.g. news tickers or movie-combined games. According to the present invention, these applications can either be disc-bound or disc-unbound, and title-bound or title-unbound. In general all disc-bound applications will be terminated if the disc is ejected, i.e. leaving the player.

A disc-unbound application however, if started once, is potentially able to continue being executed by the environments (i.e. the movie players) virtual machine (VM) or interpreter, regardless of a specific disc being inserted or not. One idea of the invention is that an application signals, e.g. by means of a flag or indication, if it is bound to disc or not. This flag indicates if the application is a disc-bound or a disc-unbound application. The flag may also be more than a single bit, and indicate conditionally how the application should behave when the storage medium is ejected, depending on defined conditions. An Application Program Interface (API) provided within the player firmware serves to extract this information by investigating this flag for each (running) application.

A further advantage of the present invention is that it provides a mechanism that allows e.g. content providers of interactive HD movie discs to use multi-disc applications that work safe and seamless over different discs. Thus, the invention improves the data security against piracy. Furthermore the invention ensures that the user of the HD movie player is able to terminate such seamless multi-disc application if he likes to. With state-of-the-art players, either the content provider would not be able to generate multi-disc applications or the user would not be able to terminate such a multi-disc application. The invention preserves the interest of both parties.

One idea is that in case of ejecting the disc (or finishing playback of a title) the player (i.e. the environment) detects who initiated the ejection. If the ejection was requested by an application having respective rights, e.g. a disc-unbound interactive application (implemented e.g. as a Java Xlet, where several Java applications may be executed simultaneously), the ejecting will not terminate disc-unbound applications. Upon insertion of another disc (or starting a new title respectively), the conditions to continue running the disc-unbound applications are checked further. Such conditions include e.g. that the new title must allow for running the disc-unbound applications. This can be further differentiated by generally allowing disc-unbound applications, or by checking through a security framework if the interactive application can be identified as authorized, or signed, for running with the new disc.

If the user directly requested the ejecting, all bound and also all unbound interactive applications are terminated. It is possible to further diversify unbound application termination for this case by asking the user to confirm the termination. This avoids unintended breaks. Furthermore it is possible to distinguish between those interactive applications related to the disc just being ejected (or title just finished) and those interactive applications unbound to the disc just being ejected (or title just finished). Termination of the first kind of applications can be generally decided by the user, as a default, while termination of the second kind can be decided by the user separately for each case.

Interactive applications executed on a VM or script interpreter of an advanced interactive movie player can be started by the player or by the user. FIG. 1 shows the life cycles of different software applications e.g. in a player while a first disc Disc-A was ejected and currently a second disc Disc-B is inserted. An arrow indicates where two user initiated applications (ii, iv) start. The application life cycles can be disc-bound (i)-(v) or disc-unbound (vi). FIG. 1 further shows differentiations for such disc-bound interactive applications that are title bound (i,ii) and such that are title-unbound (iii, iv,v).

In principle disc-bound and title-bound are very similar from a logical point of view. In a simple case, a movie disc is carrying only one title coming from one content provider, and lifecycles of all bound interactive applications end when this title ends, or is left.

In many cases however, a content provider could place more than one title on a single disc, e.g. to provide some episodes of a standard definition (SD) video on a high capacity disc. For solving the problem of controlling interactive applications whose lifecycle exceeds one title or one disc, or in other words which survives a service switch, this is very similar. The invention is (in parts) applicable in both cases. This does however not include user actions, because when playing multiple titles from one disc, the interaction of a user who ejects a disc and enters another disc is not necessary and therefore omitted. Also the examination of a below-explained disc_bound_flag can be skipped on title changes within one disc as for the cases (iii-v) in FIG. 1. The focus of explanations is on the disc-unbound application lifecycles (vi in FIG. 1) that implicitly cover multiple titles located on a single disc.

The present invention provides means for the player to distinguish between disc-bound and disc-unbound interactive applications, so that the player can determine the appropriate lifecycle for a running application. One idea of the invention is that a flag associated with every (interactive) application describes the intended usage, i.e. if the interactive application is a disc- (or title-) bound or a disc- (or title-) unbound application. A further idea is the definition of an Application Program Interface (API) residing in the player firmware and providing the controlled access for the disc_bound_flag information defined for each application. By investigating the disc_bound_flag, the player is able to determine the appropriate lifecycle, i.e. to react correctly on a disc eject request and an interactive application start request.

A further advantage of the invention is that it provides a mechanism to allow the content provider of interactive HD movie discs to use seamless multi-disc applications and on the other hand to allow the user of a player to terminate such seamless application if he likes to.

In the following it is explained what is understood as a seamless multi-disc application. A seamless multi-disc application can be useful to cover large volume content, e.g. TV serials or movie collections presented by means of one interactive application. E.g. 134 episodes of a soap opera may be stored on twenty-two discs, making a collection, and all of the episodes from all discs utilize or offer a common interactive application. This framing interactive application is visible for the user as a uniform interface, independent from what disc of the collection is currently inserted. The disc-unbound interactive application could also serve for providing inter-disc navigation, i.e. title change across multiple discs applications, or for accumulating interim results of games, or for storing the viewing order etc.

Giving the content provider a tool to establish multi-disc applications could on the other hand create disadvantages for the user, being forced to react on running disc-unbound interactive applications. When the user e.g. changes the disc in the movie player, aiming to play another movie, then the still active unbound application could bother him e.g. by asking to insert a special disc or by requesting the user to explicitly quit the service. In a more dramatic case, it could force the user to switch off the power circuit for termination. Advantageously, the invention preserves the interest of both parties.

Figure 3:
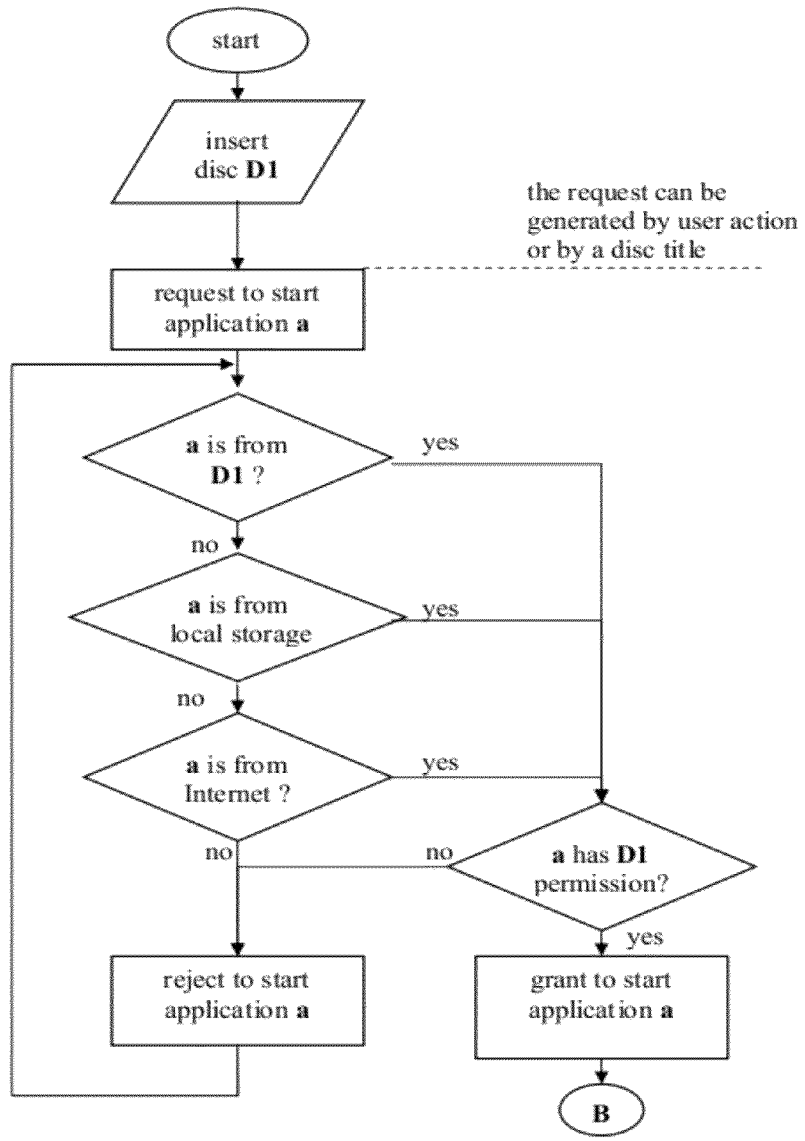
FIG. 3 a flow chart for starting an interactive application.
Figure 4:
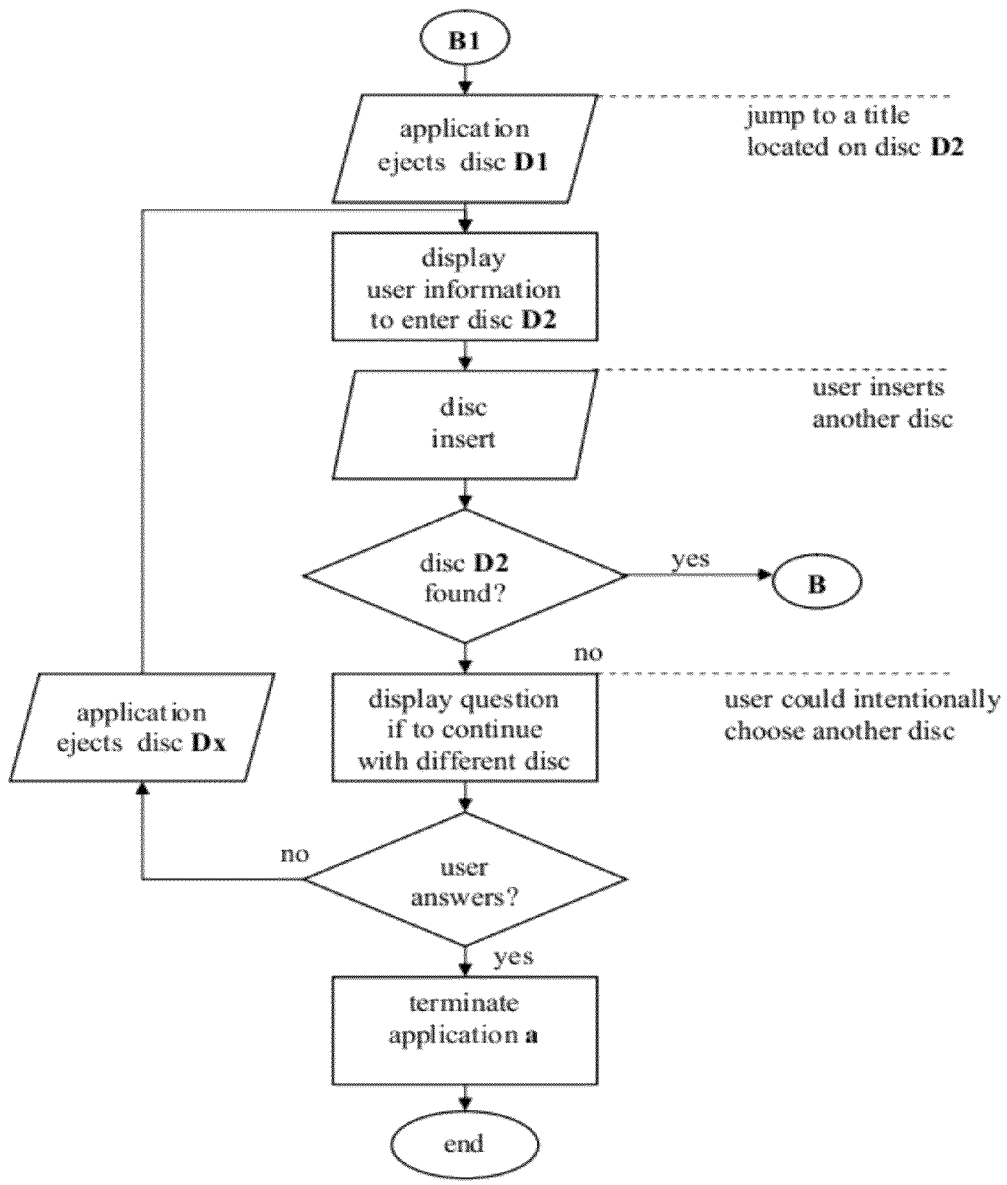
FIG. 4 a flow chart for terminating an interactive application, wherein the application ejects the medium.
Figure 5:
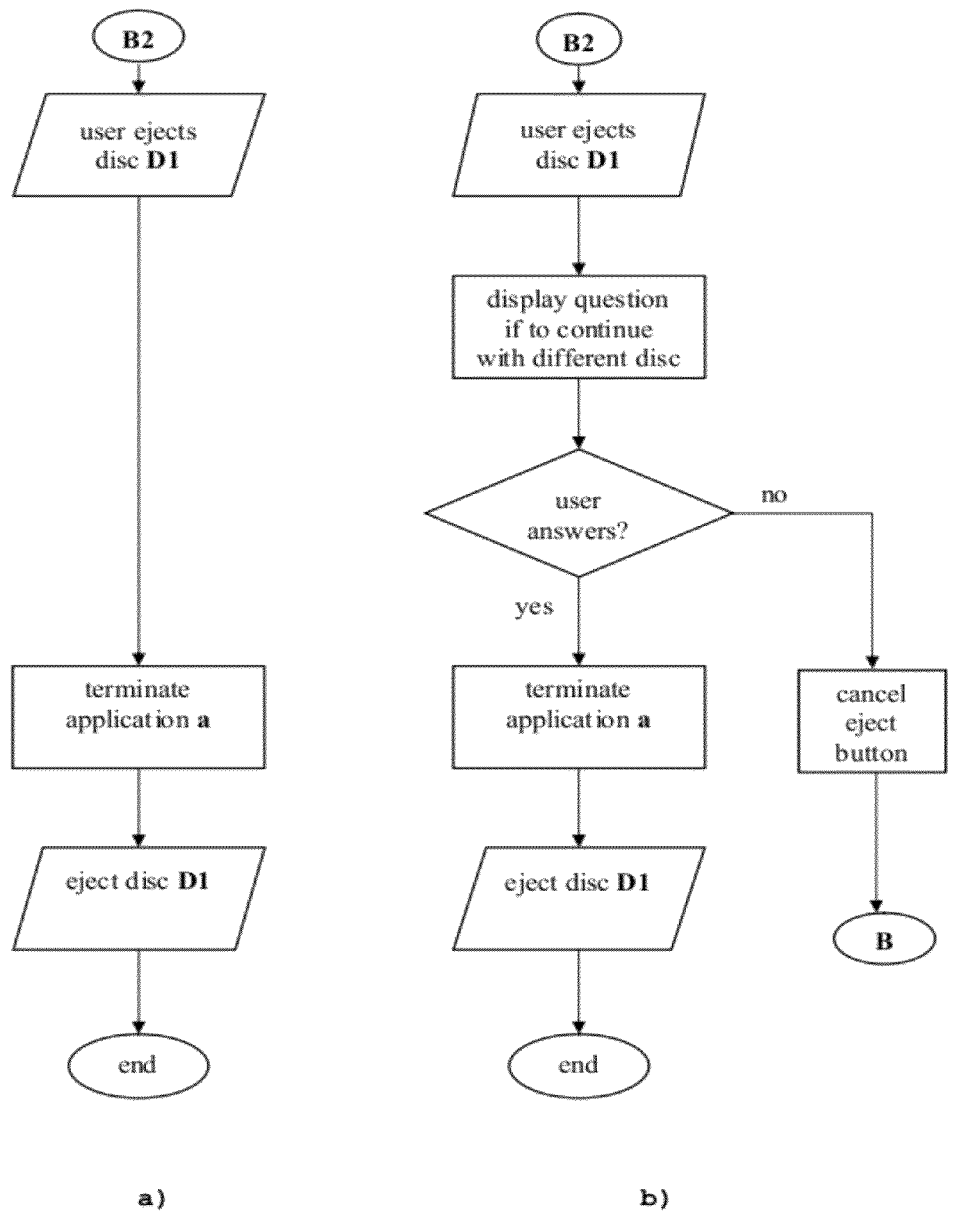
FIG. 5 a flow chart for terminating an interactive application, wherein the user ejects the medium.

As depicted in the flow charts of FIGS. 3-5, the player uses a mechanism to distinguish between both kinds of terminating disc-unbound interactive applications, as it is the player that verifies who initiates the disc eject or service change.

FIG. 3 shows in a flow diagram how an exemplary interactive application is started. Three different sources for the interactive application are incorporated handling the application that comes from the inserted disc, from the local storage of the player or from the Internet. The first case is the most common situation, because also in multi-disc applications the disc-unbound interactive application source will usually be located on all the involved discs. The second case could be e.g. a news ticker. The third case could typically be a studio server for the featured disc provided by the studio.

A security framework serves for consistency in starting any interactive application, i.e. checks if the inserted disc allows for starting unknown applications or checks if the interactive application start request can be identified as authorized from the disc e.g. by signature verification. The flow diagram of FIG. 3 is left at B when an interactive application has been successfully started.

The lifecycle of the interactive application started within the first diagram in FIG. 3 is continued by one of the two next flow charts of FIG. 4 and FIG. 5, but always only one out of the two. Any end state B in a diagram is followed by either a start state B1 or a start state B2.

The flow chart of FIG. 4 shows the actions in the case that the request to eject the disc came from a disc-unbound interactive application (e.g. a Java Xlet). The ejecting will not terminate disc-unbound applications, but the player will check, by means of e.g. the security framework and signature verification, if the disc that is inserted next is the requested one. If the following disc is the requested one, the situation is the same as when reaching the end of FIG. 3, i.e. state B in FIG. 4 is reached, and another loop of the flow chart in FIG. 3 may follow, or also the flow chart in FIG. 4. On insertion of another, not requested disc (i.e. starting a new service), the user may be informed about his action, i.e. he is told to insert the right disc or the running multi-disc application the will otherwise be terminated. In case that the user recognizes having made an error, by rejecting a service change, the disc is ejected again (or the user ejects it) and the request for inserting the right disc is repeated. In case that the user requests the service change, the interactive application is terminated and the end state is reached. The new disc will start up beginning with FIG. 3 again.

The flow chart of FIG. 5 shows the actions in case that the request to eject the disc came from the user. The flow chart in FIG. 5 a) shows a simple solution by terminating all bound and also all unbound interactive applications. A more sophisticated solution is depicted in the flow chart of FIG. 5 b). It is possible to further diversify unbound application termination by asking the user for confirmation of the termination. This avoids unintentional breaks.

Furthermore it is possible to distinguish between those interactive applications related to the disc just being ejected, and those interactive applications unbound to the disc just being ejected. The termination of the first kind of applications can be decided by the user in general while the termination of the second kind can be decided by the user separately for each.

In the following, a further embodiment of the invention is described that gives a more detailed description of the application framework. The example exploits the above-explained disc_bound_flag within the movie player firmware to ensure that a corresponding interactive application keeps running across a disc change. Also the usage of the application signature is explained within the following flowcharts depicted in FIG. 6 and FIG. 7.

Figure 6:
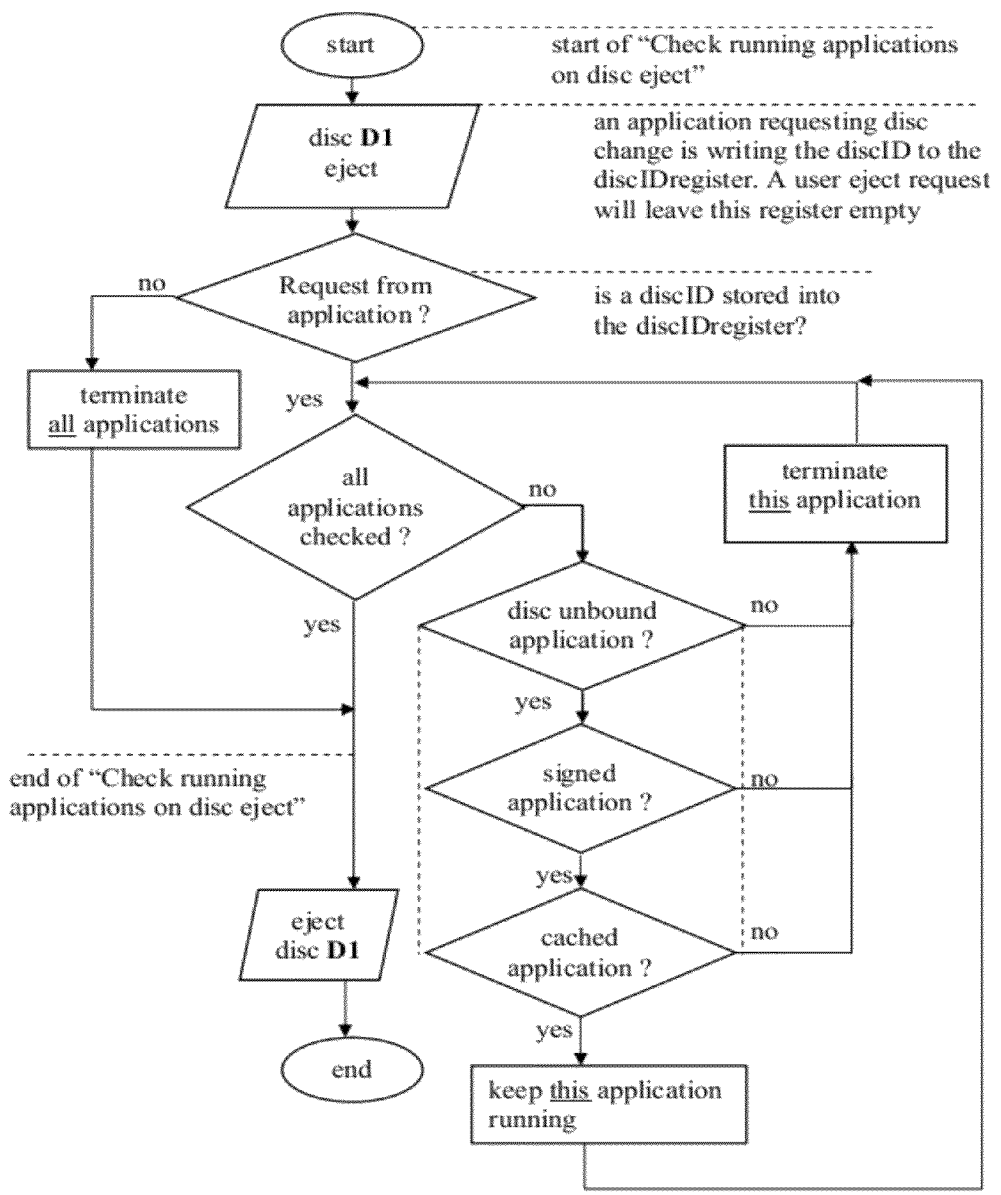
FIG. 6 a flow chart of the process to be executed before ejecting the medium.
Figure 7:
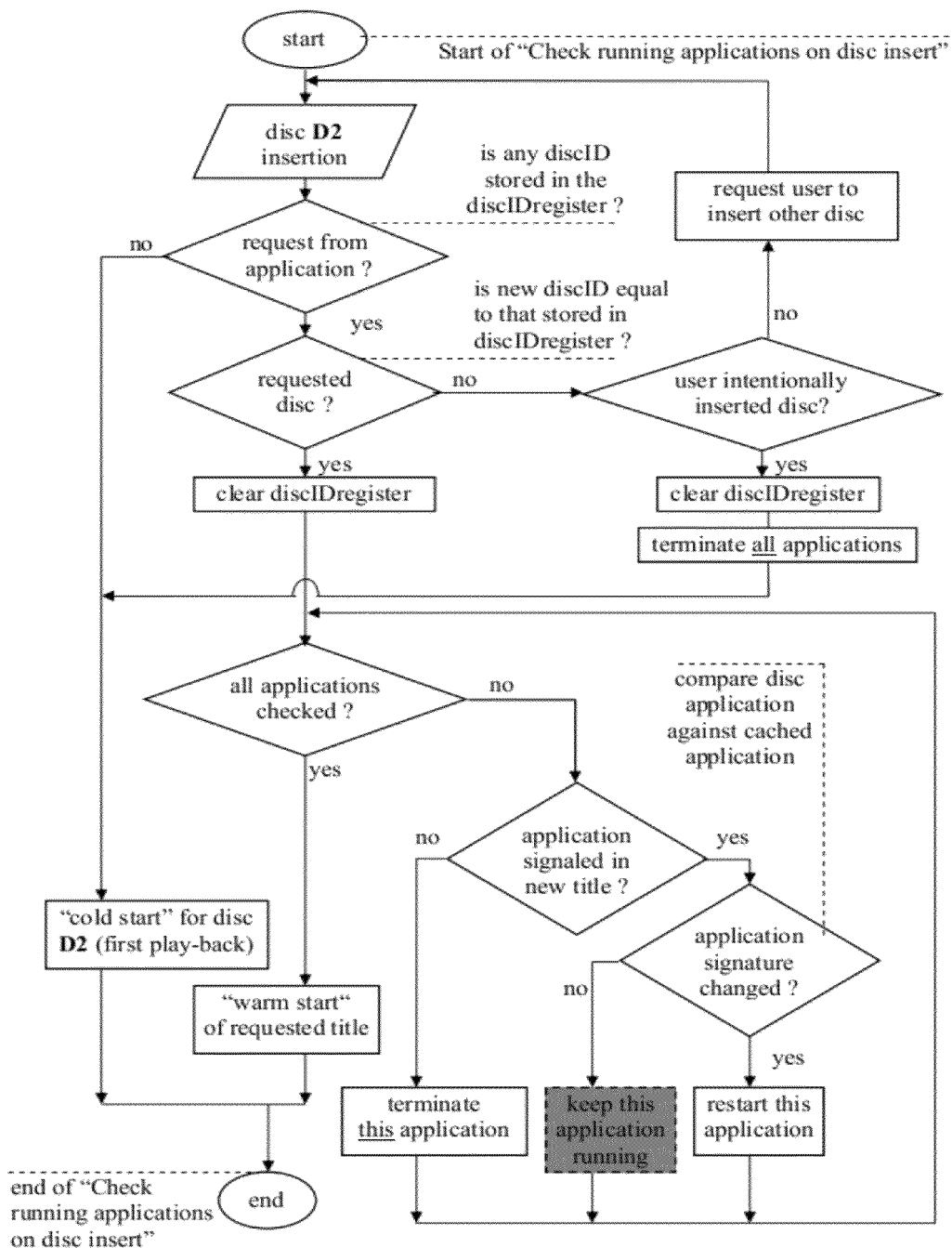
FIG. 7 a flow chart of the process to be executed after insertion of a medium.

While FIG. 6 describes what steps are processed from the movie player firmware when the request for ejecting a disc is directed to it, FIG. 7 covers the steps processed from the firmware each time a disc enters the player. The described combination of a specific insertion and ejection flow is necessary to provide multi-disc interactive applications. It shows a solution for the problem of keeping data integrity for the content providers security, and also for appropriate user experience (i.e. the user should have the impression of seamlessness etc).

The flowchart of FIG. 6 is started every time when ejecting a disc is requested. This could be requested either by the user when pressing the (hardware or software) eject button, or by an interactive multi-disc application. While the disc-unbound interactive application is preparing the eject request by writing the media identifier (discID) of the requested disc (or a plurality of media identifiers of a plurality of acceptable discs) into a special purpose register (discIDregister) in advance, the request of the user button pressing will enter the flowchart with the discIDregister being empty.

Writing the media identifier of the requested disc (or a plurality of media identifiers of a plurality of acceptable discs) into a special purpose register need not necessarily be done by the disc-unbound application itself, but it can also be done by an API, by another service or another application that is called or initiated by the disc-unbound application.

Figure 8:
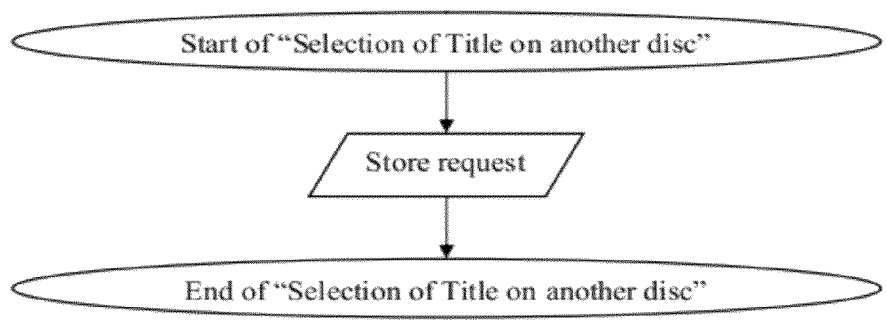
FIG. 8 an application programming interface call requesting a particular storage medium to be inserted.

In this case, the disc may be ejected immediately, but it is also possible to store a command for ejection, as shown in FIG. 8, so that the actual ejection must be confirmed by the user. This has the advantage that the user may change his mind, and the applications may continue.

Since running applications are usually stored in a cache within the player, they may generally qualify for survival of a media change. However, since such applications may require reloading code from the medium from which they were loaded, it may be useful to have the same full application code stored on all media that are accepted by an unbound application, so that reloading is possible.

The firmware is analysing the status of discIDregister, and when the request came from a user then it terminates all interactive applications. Another detail not depicted has already been explained within FIG. 5 a). After terminating all interactive applications, the movie player physically ejects the disc, and the flow chart is at its end.

When the firmware analysis detects a discID within the discIDregister, it starts to loop across all running interactive applications, checking for each if it is a disc-unbound application, if it is signed and also if the application is stored in the players cache memory. Only when all conditions are fulfilled, the application keeps running when the disc leaves the player.

In all other cases the examined interactive application is destroyed. Checking the signature of an application ensures that no unauthorized application (malicious or pirate application) is able to pass the security framework. Checking if the disc-unbound application is cached ensures that the application is able to survive when the disc leaves the player. If the application would not be stored in the cache, it would probably "starve", i.e. be unable to continue, because the disc from which it was loaded has gone and there is nothing left to reload from.

When the loop across all running applications ends, only the signed and cached disc-unbound applications are still running, and with the physically eject of the disc the flow chart is at its end.

A further idea of the invention, which is not depicted in the flowcharts, concerns the case of leaving the loop across all running interactive applications. When leaving the loop and thus all applications have been terminated, then also the discIDregister should be cleared, in order to avoid a warm start for the next disc. This will further improve data consistency and application robustness.

FIG. 7 depicts the flowchart that the movie players firmware will enter every time when a disc is inserted. First it is checked if any media identifier (e.g. discID) is stored in the discIDregister. This indicates that an interactive application requested the user to insert another disc. It is possible though that no application continues to run.

If the discIDregister is empty, the disc will start in initial mode from scratch. Starting form scratch is called a "cold" start, which destroys all running interactive applications and also clears the discIDregister. In case that a discID is stored in the discIDregister, a second check will prove if the stored discID really matches that of the inserted disc. If this is not the case, the user may be warned and be given help to decide how to proceed.

Either the user intentionally inserted another disc, then all applications running are terminated and a cold start of the disc follows, or the user made a mistake and then gets another chance to insert the correct disc, as shown in the back loop to the disc insertion flow chart of FIG. 7.

If the discID of the newly entered disc matches the discID stored within the discIDregister, the discIDregister is cleared and a new investigation loop across all running applications is executed. It is checked if the running application is also part of the new title on the new disc, and if it has the same signature as that located on the disc.

Both checks improve security and robustness. Only when both checks are successfully passed the disc-unbound interactive application remains running. If the application was not listed within the new disc (or title on the new disc), it is destroyed. If the application signature of disc and cache mismatch, the application from disc is restarted to keep consistency. The loop ends with a warm start of the disc. This means that the disc-unbound interactive application continues e.g. to control the service for playback.

Another variation not depicted in FIG. 7 is for the case that no application at all is running when leaving the application check loop. In this case also a cold start of the disc should be executed.

Figure 2:
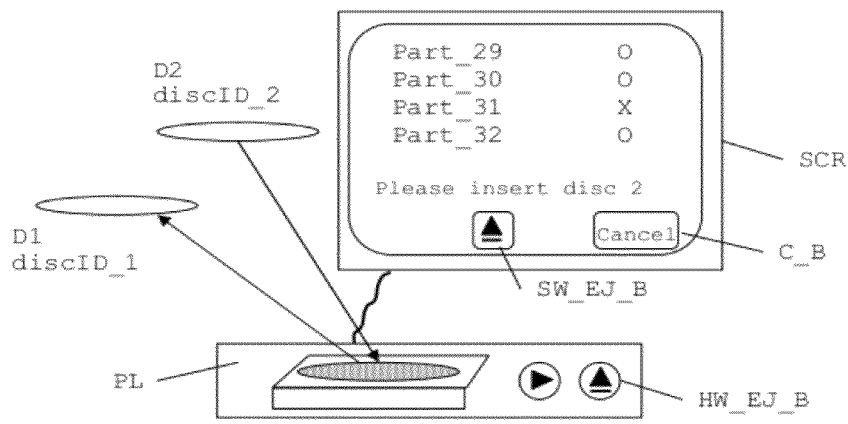
FIG. 2 an exemplary menu application.

An example is shown in FIG. 2. A disc player PL loaded from a first disc D1 having an associated identifier discID_1 a menu application, which is displayed on a screen SCR. The displayed menu contains a list of options for the user to select, a software eject button SW_EJ_B and a "Cancel" button C_B. The player has a hardware eject button HW_EJ_B. When the user selects a title, e.g. Part_31, the menu application determines from its internal list that the selected item is on another disc than the one being currently inserted, and displays a message for the user to insert the requested disc. Internally, the application stores the identifier for the requested disc discID_2 in a dedicated register (discIDregister). E.g. the currently inserted disc may now be ejected when the user confirms his selection, e.g. by selecting again his choice Part_31, and the user may now eject the current disc with the hardware or software eject button. Since the application has stored an identifier for a requested next disc (discID_2) in the dedicated register, the ejection is classified as not user-initiated but application-initiated. Therefore disc-unbound applications, like the menu application as such, may continue to run. If the user changes his mind, he may still press the Cancel button C_B. This may e.g. have the effect that the already open disc tray is closed again, and the application returns to its previous state.

Generally, consumer electronic devices may provide possibilities for advanced interactivity for the user, implemented as software applications. The invention provides a method for executing software applications within a playback device for audio-video data, wherein data from a first removable storage medium are read for a software application to be executed within said playback device, and the data comprise an indication defining a termination condition for the application. Based on said termination condition and depending on how the medium holding the application is ejected, the application is terminated or may survive.

Another example for an application is a guide-application constructed to cover multiple discs. Entering the first disc of the serial starts the guide-application, and the guide-application will survive any disc changes until a disc that is not part of the serial enters. This provides for the user a seamless experience. The invention ensures that only authorized applications may automatically survive disc changes, while non-matching interactive applications are terminated.

The invention is applicable to all kinds of storage media and corresponding players, which are today particularly optical discs like DVD, HD-DVD or Blu-ray discs and their corresponding players. The invention is particularly useful for players that are able to run interactive software applications.

Examples for software applications are a news ticker connecting to the Internet, or organizing software in a personal-data-assistant (PDA) manner that may be modified depending on the currently inserted disc, e.g. calendar manager that reads data from a local storage like a hard-disc drive (HDD).

The invention claimed is:

1. Method executed by a processor for determining the lifetime of a software application associated with audio-video "AV") data, the AV data comprising a plurality of titles, the method comprising the steps of
    1. detecting selection of a first title read from a first storage medium;
    2. detecting on the first storage medium a first and a second application associated with the first title, and a first indication relating to the first application and a second indication relating to the second application, wherein the first and second applications are distinct;
    3. playing back the first title and executing the first and second applications;
    4. upon termination of the first title, terminating the first application if the first indication has a first value, and otherwise continuing the first application, and terminating the second application if the second indication has the first value, and otherwise continuing the second application;
    5. upon ejection of the first storage medium, terminating the first application if the first indication has a certain value different from the first value and indicating a disc bound application, and otherwise continuing the first application, and terminating the second application if the second indication has the certain value different from the first value and indicating a disc bound application, and otherwise continuing the second application;
    6. detecting insertion of a second storage medium;

7. retrieving data from the second storage medium, the data comprising a third indication and AV data of a second title, the third indication being distinct from the second indication; and
8. continuing the first application if the third indication retrieved from the second storage medium has a certain value, and otherwise terminating the first application, wherein the AV data of the second title are played back without the first application being executed, and continuing the second application if the third indication retrieved from the second storage medium has a certain value, and otherwise terminating the second application, wherein the AV data of the second title are played back without the second application being executed.

2. The method according to claim 1, wherein the at least one of the first and second software application is executed on a device that is connected to the playback device, and the connection between the playback device and the device on which the software application is executed includes control lines for terminating the at least one of the first and second software application.

* * * * *